(12) United States Patent
Kang et al.

(10) Patent No.: US 6,416,809 B1
(45) Date of Patent: Jul. 9, 2002

(54) BEAN VEGETABLES AND CULTIVATION THEREOF USING HIGHLY ELECTROLYZED WATER

(75) Inventors: Sunchul Kang, 320-1202, Samjoo Apartment, #570; Shin Park, 262-1407, Shiji Bosung Apt., both of Shinmae-dong Soosung-ku Taegu 706-170 (KR); Jaeduck Moon, Taegu (KR)

(73) Assignees: Sunchul Kang; Shin Park, both of Taegu (KR)

( * ) Notice: Subject to any disclaimer, the term of this patent is extended or adjusted under 35 U.S.C. 154(b) by 0 days.

(21) Appl. No.: 09/530,872

(22) PCT Filed: Sep. 8, 1999

(86) PCT No.: PCT/KR99/00531

§ 371 (c)(1), (2), (4) Date: Apr. 4, 2001

(87) PCT Pub. No.: WO00/13482

PCT Pub. Date: Mar. 16, 2000

(30) Foreign Application Priority Data

Aug. 9, 1998 (KR) ............................................ 98-36946

(51) Int. Cl.$^7$ .................................................. A23L 1/20
(52) U.S. Cl. .......................... 426/634; 426/74; 426/809
(58) Field of Search .......................... 426/634, 74, 809

(56) References Cited

FOREIGN PATENT DOCUMENTS

| GB | 1467545 | 3/1977 |
|---|---|---|
| GB | 2189673 | 11/1987 |

*Primary Examiner*—Anthony J. Weier
(74) *Attorney, Agent, or Firm*—Morrison & Foerster LLP

(57) ABSTRACT

Shown are clean bean vegetables and a method for cultivating clean, bean vegetables without using agricultural chemicals. Provision of highly electrolyzed water allows soybean sprouts to be grown faster without being rotted. The highly electrolyzed water prepared by electrolyzing inorganic salt-added water. The highly electrolyzed water can be reused, so it is economically favorable. The soybean sprouts grown with the highly electrolyzed water are rich in inorganic elements with excellent taste in addition to being of more alkalinity.

12 Claims, 4 Drawing Sheets

-●-: ALKALINE WATER
-○-: ACIDIC WATER

CULTIVATION PERIODS (DAYS)

pH3  pH7

BEAN VEGETABLES AND CULTIVATION THEREOF USING HIGHLY ELECTROLYZED WATER

This application is a 371 of PCT/KR99/00531 filed Sep. 8, 1999.

TECHNICAL FIELD

The present invention relates to clean/chemical-free, bean vegetables which are grown by use of highly electrolyzed water. Also, the present invention is concerned with a method for cultivating clean, nutrition-rich bean vegetables without rotting.

PRIOR ART

Much research has demonstrated the usefulness of soybean sprouts. Particularly, they are reported to effectively cure hangover by virtue of their high content of aspartic acid, which is involved in alcohol catabolism. In addition, soybean sprouts are rich in various nutrients, including vitamins such as vitamin C, fibers, proteins, enzymes such as phytase, physiologically active substances such as saponin, and minerals, and have a function of scavenging active oxygen, showing prophylactic effects against cancers and adult diseases.

Bean vegetables, such as soybean sprouts and mungbean sprouts, are putrescible, suffering from rot. black spots, red spots, brown spots. flacherie, stripe disease, etc. Regardless of harmfulness or harmlessness to the human body, rotting of bean vegetables has a fatal influence on their goods values. As bacteria causative of such diseases, Pseudomonas sp. and Fusarium sp. are reported (Myong, I.S., Cause and Control of the Rotting of Soybean Sprouts. a thesis for a master degree in Korea University, Korea).

In order to prevent the rotting of bean vegetables, there are conventionally conducted many methods which are exemplified by treatment of seed beans with agricultural chemicals (sterilizer for disinfecting seeds, such as vitaziram and homai), ozone sterilization, antibacterial microbe treatment, far infrared treatment using ceramics, and chitosan treatment. Further, there was even suggested that the whole growth procedure of bean vegetables is conducted in a germ-free environment.

However, these conventional methods suffer from their own disadvantages. For example, when the agricultural chemicals are used, excellent anti-rotting effects cen be obtained, but dangerous toxicity to the human body is also effected. Ozone sterilization, antibacterial microbe treatment, chitosan treatment and growth in ceramic vessels cannot completely prevent the rotting of bean vegetables nor guarantee repetition of the same effects. Cultivation of clean bean vegetables in germ-free facilities gives rise to an increase in the production cost.

DISCLOSURE OF THE INVENTION

Based on the intensive and thorough research on the growth of clean, bean vegetables without using chemicals, the present inventors found that highly electrolyzed water (strongly acidic water and strongly alkaline water) shows superb sterilizing effects on the growth of bean vegetables.

Obtained by electrolyzing an NaCl or KCl water at a redox potential difference of 1,000 mV or higher into strongly acidic water and strongly alkaline water, the electrolyzed water used in the present invention has excellent sterilizing and cleaning functions. Although its sterilizing mechanism is not clearly disclosed, electrolyzed water has various, significant advantages of showing potent bactericidal activity against a broad spectrum of bacteria, producing no toxic residues, unlike chemicals, and being not harmful to the human body at all (Komeyasu. Mi. and Y. Miura, 1981. Effects of electrolytic reduction on suitability of soybean for making Tofu. Nippou Shokuhin Kogyo Gakkuishi 28:41). In addition, use of electrolyzed water in the cultivation of bean vegetables requires only a low installation cost. Particularly, when cultivated with alkaline water, the bean vegetables contain rich inorganic elements as well as exhibit more intensified functions as alkali foods.

Therefore, it is an object of the present invention to provide clean/chemical-free, bean vegetables which are rich in inorganic elements.

It is another object of the present invention to provide a method for cultivating clean/chemical-free, bean vegetables at a fast growth rate without causing rotting.

In accordance with an aspect of the present invention, there is provided bean vegetables, cultivated with highly electrolyzed water which is prepared by electrolyzing inorganic salt-added water.

In accordance with another aspect of the present invention, there is provided a method for cultivating bean vegetables in which highly electrolyzed water is provided to bean vegetables continually and in a reclaim pattern.

BRIEF DESCRIPTION OF THE DRAWINGS

The above and other objects, features and other advantages of the present invention will be more clearly understood from the following detailed description taken in conjunction with the accompanying drawings, in which.

BEST MODES FOR CARRYING OUT THE INVENTION

In the present invention, highly electrolyzed water plays a pivotal role in growing clean/chemical-free, bean vegetables. The highly electrolyzed water is prepared by electrolyzing the water added with inorganic salts. Examples of available inorganic salts include NaCl and KCl. When being analyzed, the highly electrolyzed water is rich in sodium (Na) and potassium (K). Useful water are acidic water ranging, in pH, from 2 to 6.5 and alkaline water ranging, in pH, from 7.5 to 12.5.

When using subterranean water, soybean sprouts are found to be unable to grow at 25° C. or higher, because of rotting. In contrast, the highly electrolyzed water allows soybean sprouts to grow well at the high temperatures, in addition, the soybean sprouts crown with the highly electrolyzed water prepared from NaCl or KCl-added water are analyzed to get heavier and taller compared with those grown with subterranean water CT)H 7.0).

Analysis for nutrients, including inorganic elements and amino acids, shows that the soybean sprouts of the present invention have richer inorganic elements than and a similar amino acid composition to those Crown with subterranean water.

In addition, the soybean sprouts of the present invention are better in the requirements for foods, including taste, smell, texture sense and whole favor, than conventional soybean sprouts, as measured through a sensory evaluation.

A better understanding of the present invention may be obtained in light of the following examples which are set forth to illustrate, but are not to be construed to limit the present invention.

EXAMPLE I

Production of Highly Electrolyzed Water Using NaCl

For production of highly electrolyte water, there was used an apparatus which was designed by one of the present inventors (disclosed in Korean Pat. Appln No. 99-14335, titled "Apparatus for Separating Ions in Liquid"). After pure NaCl, commercially available from Shinyo Chemicals, Japan, was added at an amount of 0.5 % (w/v) in water, the solution was electrolyzed into strongly acidic water and strongly alkaline water in the electrolysis apparatus.

Figure 1:
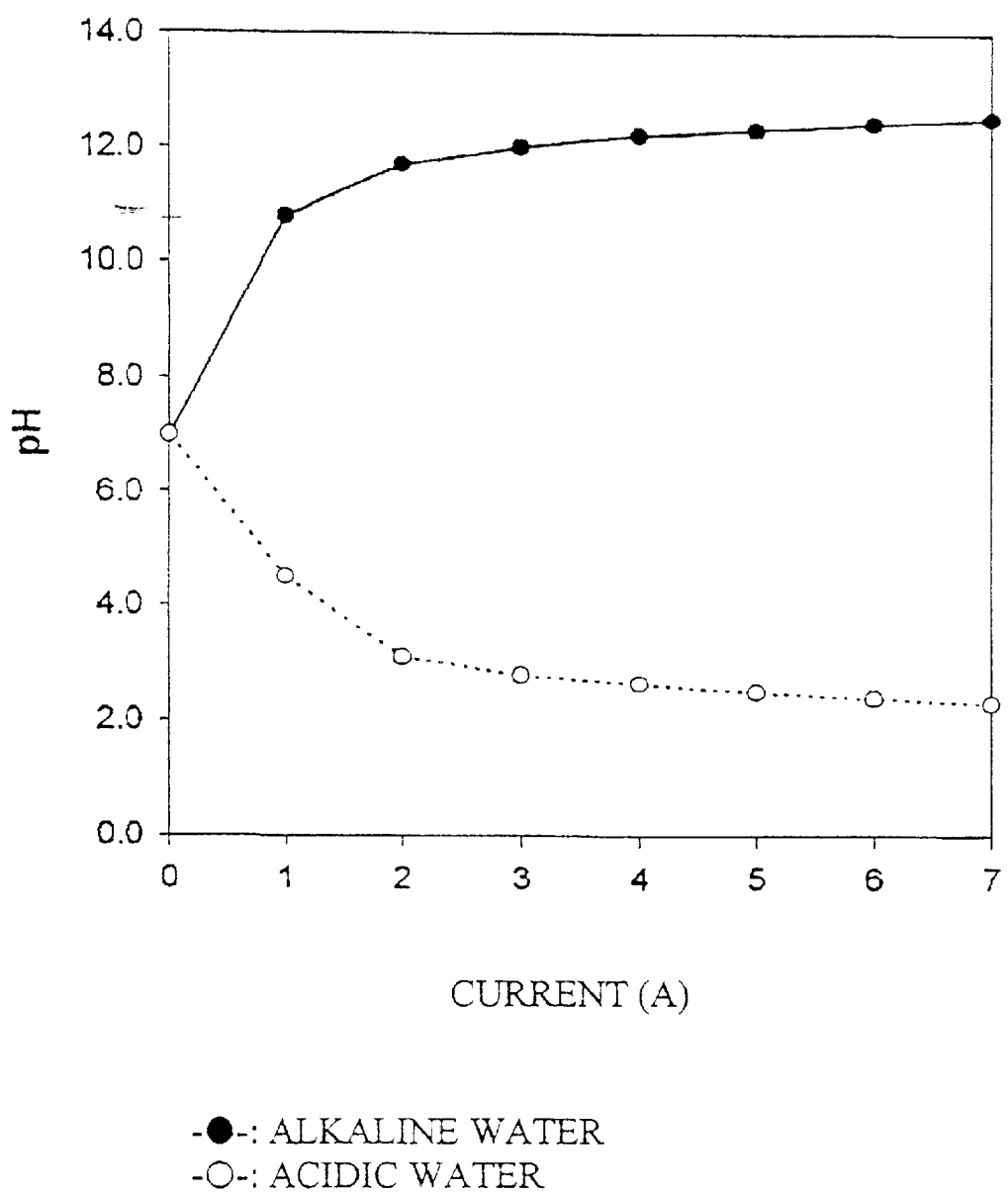
FIG. 1 is a graph showing the pH change of the electrolyzed water with the current applied.

The pH values of the electrolyzed water was changed with the intensity of the current applied to the apparatus, as shown in FIG. 1. pH measurement of the acidic and alkaline water obtained was conducted by use of a pH meter, such as that manufactured by Orion Research Inc., U.S.A., identified as Model Orion 611. When an aqueous 0.5 % NaCl solution was electrolyzed, acidic water (about pH 2.0) and alkaline water (about pH 12.0) were produced at a current of 4A or greater.

The alkaline water (pH 11.0) and acidic water (pH 3.0) obtained in this manner were analyzed for inorganic elements, along with subterranean water as a control and the results are given in Table 1, below. As shown in Table 1, the acidic water and the alkaline water had Na contents higher than 82.1 and 72.7 times that of the control.

TABLE 1

Inorganic Elements in Highly Electrolyzed Water from Aqueous 0.5% NaCl Solution

| Minerals | Contents (ppm) | | |
| --- | --- | --- | --- |
| | Acidic Water (pH 3.0) | Subterranean Water (pH 7.0) | Alkaline Water (pH 11.0) |
| Ca | 41.6 | 18.0 | 28.6 |
| Mg | 4.2 | 4.8 | 4.1 |
| K | 3.7 | 1.3 | 3.9 |
| Na | 616.0 | 7.5 | 545.6 |
| P | 0 | 0 | 0 |
| Fe | 0 | 0 | 0 |
| B | 0 | 0 | 0 |
| Cu | 0 | 0 | 0 |
| TOTAL | 665.5 | 31.6 | 582.2 |

EXAMPLE II

Production of Highly Electrolyzed Water Using KCl

For production of highly electrolyte water there was used an apparatus which was designed by one of the present inventors (disclosed in Korean Pat. Appln No. 99-14335, titled "Apparatus for Separating Ions in Liquid") as in Example I. After pure KCl, commercially available from DuckSan Chemicals, Korea, was added at an amount of 0.5 % (w/v) in water, the solution was electrolyzed into strongly acidic waxer (up down about pH 2.0) and strongly alkaline water (up to about pH 12.0) in the electrolysis apparatus.

The alkaline water (pH 11.0) and acidic water (pH 3.0) obtained in this manner were analyzed for inorganic elements, along with subterranean water as a control and the results are given in Table 2, below. As shown in Table 2, the acidic water and the alkaline water had Na contents higher than 424.3 and 381.0 times that of the control.

TABLE 2

Inorganic Elements in Highly Electrolyzed Water from Aqueous 0.5% KCl Solution

| Minerals | Contents (ppm) | | |
| --- | --- | --- | --- |
| | Acidic Water (pH 3.0) | Subterranean Water (pH 7.0) | Alkaline Water (pH 11.0) |
| Ca | 40.5 | 18.0 | 27.8 |
| Mg | 4.6 | 4.8 | 2.7 |
| K | 551.6 | 1.3 | 495.4 |
| Na | 7.6 | 7.5 | 7.6 |
| P | 0 | 0 | 0 |
| Fe | 0 | 0 | 0 |
| B | 0 | 0 | 0 |
| Cu | 0 | 0 | 0 |
| TOTAL | 604.3 | 31.6 | 533.6 |

EXAMPLE III

Effect of Cultivation Temperature on Growth of Bean Vegetables with Subterranean Water Soybean sprouts were cultured in a conventional process using subterranean water. First, 600 g of soybean purchased in a market were immersed in subterranean water for 3.5 hours. Subsequently, the beans were placed in sprout-growing jars (50–80 cm high with a diameter of 50 cm) which were then covered with lids and allowed to stand at 15, 20, 25 and 30° C. in a dark condition. For growing sprouts, subterranean water was provided once every 3 hours until the jars were fully filled. The used water was collected for reuse.

Many stems of the soybean sprouts grown for five days were selected at random and examined for their growth (weight and height) and whether they were rotted. The results are Riven in Table 3, below.

TABLE 3

Growth of Bean Sprouts Grown for 5 Days with Subterranean Water

| Cultivation Temp. (° C.) | Weight of Sprout (g/EA) | Length of Sprout (mm/EA) |
| --- | --- | --- |
| 15 | 0.57 | 97.2 |
| 20 | 0.91 | 247.4 |
| 25 | —* | —* |
| 30 | —* | —* |

*too rotten to measure

EXAMPLE IV

Effect of Cultivation Temperature on Growth of Bean Vegetables with Highly Electrolyzed Water Soybean sprouts were cultured using highly electrolyzed water. First, 600 g of soybean purchased in a market were immersed in highly electrolyzed water (acidic water pH 2.0–6.0, alkaline water pH 9.0–12.0) and subterranean water (pH 7.0) for 3.5 hours, respectively. Subsequently, the beans were placed in sprout-growing jars (50–80 cm high with a diameter of 50 cm) which were then covered with lids and allowed to stand at 15–40° C. in a dark condition. For growing sprouts, electrolyzed water and subterranean water was provided once every 3 hours until the jars were fully filled. The used water was collected for reuse.

Figure 3:
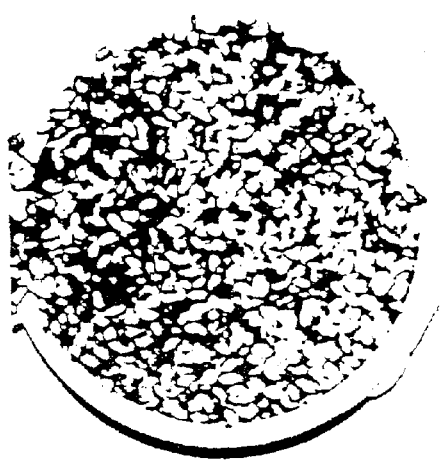
FIG. 3 is a photograph showing soybean sprouts grown for 5 days in jars using acidic water (pH 3.0) and subterranean water (pH 7.0)
Figure 3:
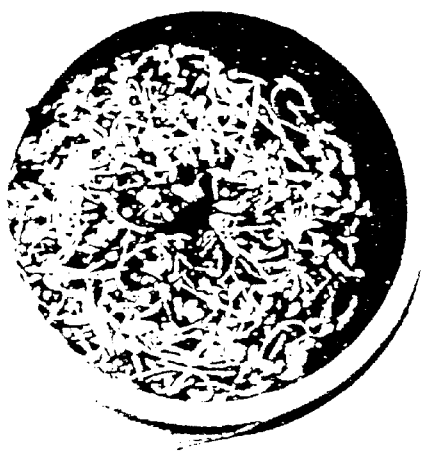
Figure 4:
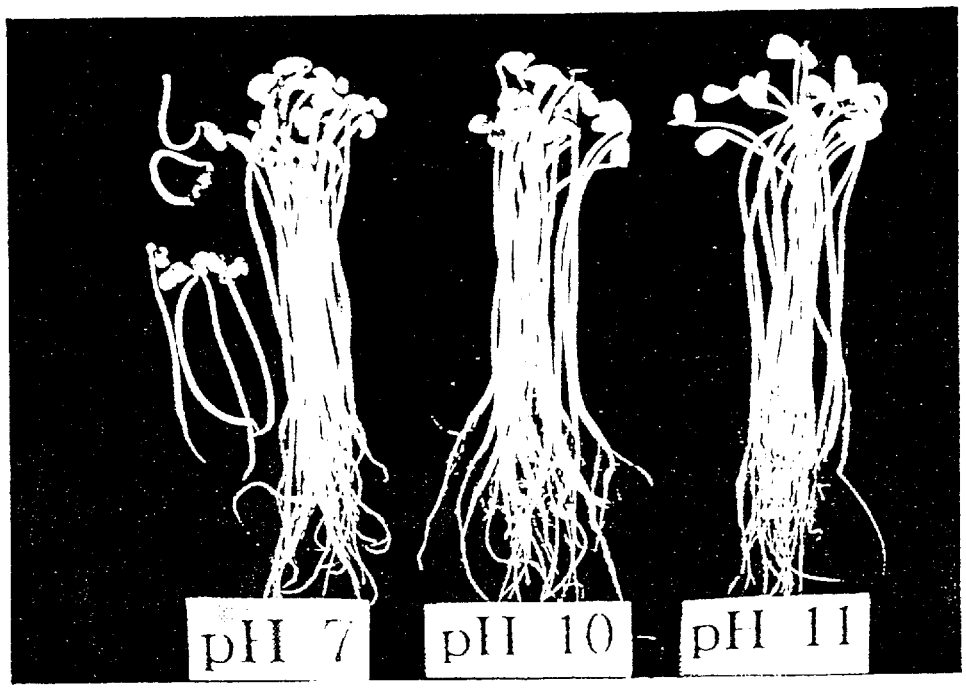
FIG. 4 is a photograph showing soybean sprouts grown at 25° C. for 5 days using alkaline water (pH 10.0, 11.0) and subterranean water (pH 7.0).

Many stems of the soybean sprouts grown were selected at random and examined for their growth (weight and height). When bean sprouts were grown at 25° C. or higher with the highly electrolyzed water, the most appropriate growth period of time was found to be 5–6 days. In contrast, through the conventional manner, it took 7–12 days for bean sprouts to grow to the best state upon cultivation at 20° C. or lower with subterranean water. So, the bean sprouts grown for 5 days were analyzed and the results are given in Table 4, below and FIGS. 3 and 4. When being cultivated at 25 or 30° C. with highly electrolyzed water, as apparent from the data, the bean sprouts were not rotted at all. In contrast, through the conventional mariner, subterranean water or tap water were unable to grow bean sprouts to the best states at 25 or 30° C. Suitable was the acidic water which had a pH range of 2.0–4.0 and preferably 3.0–4.0. Correspondingly. the alkaline water suitable to grow bean sprout had a pH range of 10.0–12.0 and preferably 10.0–11.0.

TABLE 4

Properties of Bean Sprouts Grown for 5 Days with Highly Electrolyzed Water from 0.5% NaCl or KCl Solution

| pH of Electrolyzed Water | Cultivated at 25° C. | | Cultivated at 30° C. | |
| --- | --- | --- | --- | --- |
| | Weight (g/EA) | Length (mm/EA) | Weight (g/EA) | Length (mm/EA) |
| 2 | 0.43 | 105.1 | 0.54 | 121.3 |
| 3 | 0.89 | 189.3 | 0.94 | 210.8 |
| 4 | 0.96 | 255.1 | 0.95 | 260.8 |
| 5 | —* | —* | —* | —* |
| 7 | —* | —* | —* | —* |
| 9 | —* | —* | —* | —* |
| 10 | 0.97 | 251.0 | 0.96 | 258.3 |
| 11 | 0.89 | 189.0 | 0.91 | 211.7 |
| 12 | 0.41 | 96.7 | 0.48 | 108.3 |

*too rotten to measure

EXAMPLE V

Comparison between Bean Vegetables with Highly Electrolyzed Water and Subterranean Water Experiment 1: Analysis for inorganic Elements in Bean Sprouts Grown with Electrolyzed NaCl Water and Subterranean Water.

Using an aqueous 0.5% (w/v) NaCl solution. highly electrolyzed water was produced in the same manner as in Example I. After being cultivated with this electrolyzed water and subterranean water, bean sprouts were analyzed for inorganic elements. In this regard, 50 g of each of the bean sprouts grown with the highly electrolyzed water and the subterranean water (control) were lyophilized in a freeze-dryer. such as that manufactured by Ilshin Engineering Co. Ltd., Korea, identified as Model MCFD 5508, and ground with a grinding machine, such as that manufactured by Hanil Co. Ltd., Korea, identified as Model FM-7071 to give samples to be analyzed for inorganic ions. After being weighed in an electronic scale, 1.0 g of each of the samples was burned at 600° C. for 1 hour in a microwave furnace, such as that manufactured by CEM Co., U.S.A., identified as Model MAS-7000, and dissolved in 50 ml of 1 N hydrochloric acid for 2 hours with stirring. The solution was passed through a filter, after which the filtrate was added with deionized water to 100 ml and then, diluted by 10 folds. The diluted samples were analyzed for inorganic elements using an analyzer (an inductively coupled plasma (Model: Liberty Series II), Varian, U.S.A.). The results are given in Table 5, below.

TABLE 5

Inorganic Elements in Bean Sprouts Grown for 5 Days with Highly Electrolyzed Water from Aqueous 0.5% NaCl Solution

| | Contents (mg/g of dry weight of Sprouts) | | |
| --- | --- | --- | --- |
| Minerals | Acidic Water (pH 3.0) | Subterranean Water (pH 7.0) | Alkaline Water (pH 11.0) |
| Na | 4.7 | 1.3 | 8.7 |
| K | 8.4 | 12.4 | 9.6 |
| Ca | 3.7 | 5.0 | 4.3 |
| Mg | 2.8 | 3.5 | 3.0 |
| P | 8.1 | 8.4 | 7.5 |
| Fe | 0.2 | 0.1 | 0.1 |
| Zn | 0.3 | 0.2 | 0.1 |
| B | 0 | 0 | 0 |
| Mn | 0 | 0 | 0 |
| Cu | 0 | 0 | 0 |
| TOTAL | 28.2 | 30.9 | 33.3 |

As shown in Table 5, the bean sprouts grown with the alkaline water (pH 11.0) produced from the NaCl solution were found to have a content of inorganic elements greater by 7.7% in total than were the bean sprouts crown with the subterranean water (pH 7.0). Particularly, the content of Na in the bean sprouts grown with the alkaline water was 6.7 times greater than in those grown with the control.

Experiment 2: Analysis for Inorganic Elements in Bean Sprouts Grown with Electrolyzed KCl Water and Subterranean Water Using an aqueous 0.5% (w/v) KCl solution, highly electrolyzed water was produced in the same manner as in Example II. After being cultivated with this electrolyzed water and subterranean water, bean sprouts were analyzed for inorganic elements in the same procedure as that of Experiment 1. The results are given in Table 6, below.

TABLE 6

Inorganic Elements in Bean Sprouts Grown for 5 Days with Highly Electrolyzed Water from Aqueous 0.5% KCl Solution

| | Contents (mg/g of dry weight of Sprouts) | | |
| --- | --- | --- | --- |
| Minerals | Acidic Water (pH 3.0) | Subterranean Water (pH 7.0) | Alkaline Water (pH 11.0) |
| K | 11.6 | 11.4 | 21.3 |
| Na | 2.1 | 1.3 | 1.2 |
| Ca | 4.0 | 5.4 | 4.9 |
| Mg | 2.6 | 3.4 | 2.7 |
| P | 6.5 | 6.4 | 6.6 |
| Fe | 0.2 | 0.1 | 0.1 |
| Zn | 0.2 | 0.1 | 0.1 |
| B | 0 | 0 | 0 |

TABLE 6-continued

Inorganic Elements in Bean Sprouts Grown for 5 Days with
Highly Electrolyzed Water from Aqueous 0.5% KCl Solution Contents (mg/g of dry weight of Sprouts)

| Minerals | Acidic Water (pH 3.0) | Subterranean Water (pH 7.0) | Alkaline Water (pH 11.0) |
|---|---|---|---|
| Mn | 0 | 0 | 0 |
| Cu | 0 | 0 | 0 |
| TOTAL | 27.2 | 28.1 | 36.9 |

As shown in Table 6, the bean sprouts grown with the a alkaline water (pH 11.0) produced from the KCl solution were found to have a content of inorganic elements greater by 31.3% in total than were the bean sprouts crown with the subterranean water (pH 7.0). Particularly, the content of K in the bean sprouts grown with the alkaline water was 1.9 times greater than in those grown with the control.

Taken together, the data obtained in Experiments 1 and 2 demonstrate that bean sprouts can be supplemented or reinforced with particular inorganic elements when being cultivated with the alkaline water produced from the solutions containing the inorganic elements.

Figure 2:
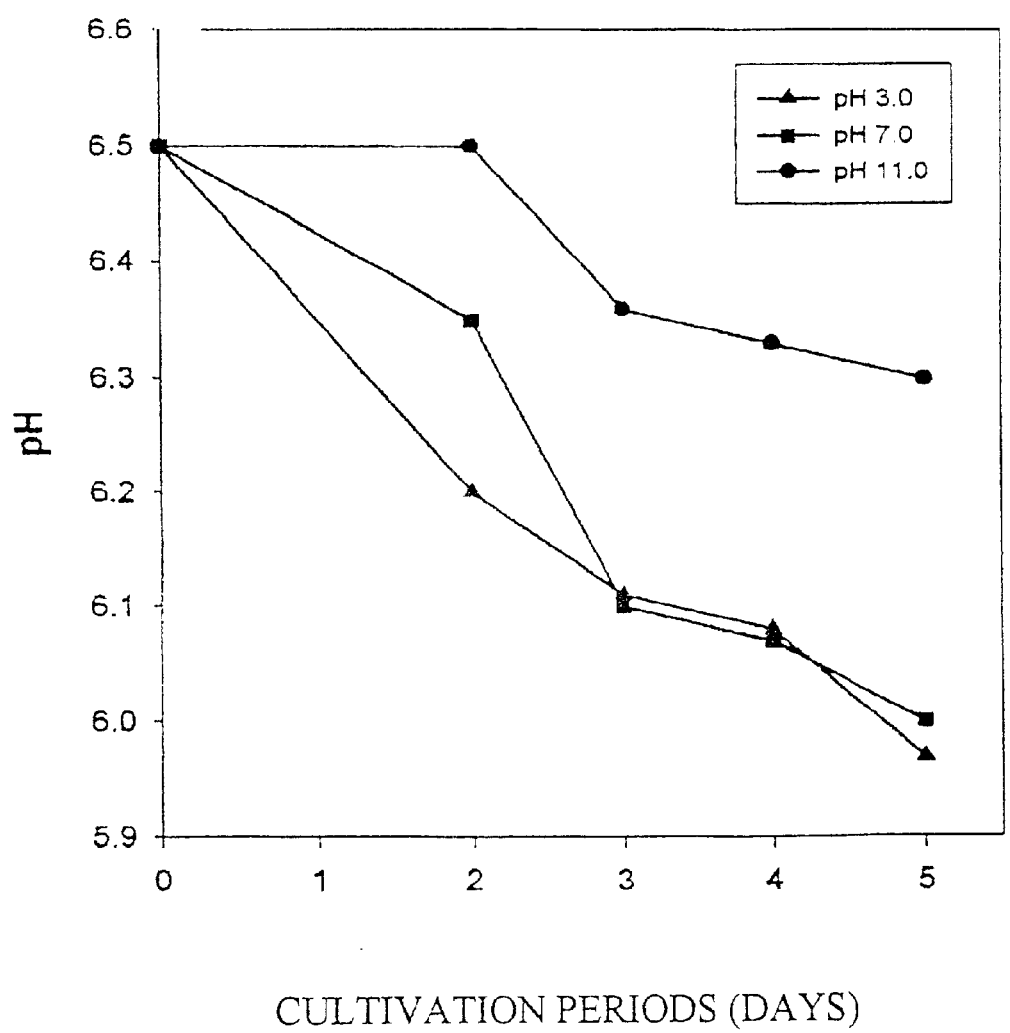
FIG. 2 is a graph in which the pH values of soybean sprouts are plotted for alkaline water (pH 11.0), acidic water (pH 3.0) and subterranean water (pH 7.0) with regard to cultivation periods.

Experiment 3: pH Values of Bean Sprouts Grown with Highly Electrolyzed Water and Subterranean Water Using 0.5% (w/v) NaCl and KCl solutions, highly electrolyzed water was prepared in the same manners as in Examples I and II, respectively. After being cultured with the highly electrolyzed water and subterranean water, the bean sprouts grown were measured for pH values. In this regard, 50 g of each of the bean sprouts grown with highly electrolyzed water and subterranean water were lyophilized and then, ground in a grinding machine such as that manufactured by Hanil Co. Ltd., Korea, identified as Model FM-7071, to give samples. 10 g of each of the samples were added in 100 ml of deionized water, suspended for 5 hours and measured for pH values by use of a pH meter, such as that manufactured by Orion Research Inc., U.S.A., identified as Model Orion 611. The results are given in FIG. 2. 5 days after growth, the bean sprouts grown with the alkaline water (pH 11.0) had pH 6.33 which was larger by 0.32 than that of the bean sprouts with subterranean water (pH 6.01). That is, the bean sprouts grown with the alkaline water were alkalified to as much extent.

Experiment 4: Amino Acids of Bean Sprouts Cultivated with Strongly Electrolyzed Water and Subterranean Water Using 0.5% (w/v) NaCl and KCl solutions, highly electrolyzed water was prepared in the same manners as in Examples I and II, respectively. After being cultured with the highly electrolyzed water and subterranean water the bean sprouts grown were analyzed for amino acid composition. In this regard, 50 g of each of the bean sprouts grown with highly electrolyzed water and subterranean water were lyophilized and then, ground in a grinding machine such as that manufactured by Hanil Co. Ltd., Korea, identified as Mylodel FM-7071, to give samples. After being weighed in an electronic scale, 0.1 g of each of samples was placed in a test tube (120–200 mm long with a diameter of 12–16 mm) and added with 3 ml of 6N HCl. The test rube was filled with liquid nitrogen while removing bubbles. After the mouth of the test tube was closed with the aid of a torch, the sample was treated at 110° C. for 24 hours to complete hydrolysis and then, passed through a filter. Using a rotary vacuum evaporator, hydrochloric acid was removed from the filtrate while a trace amount of deionized water was added gradually to the final volume of 2 ml. After completion of the removal of HCl, the sample was completely lyophilized in a freeze-dryer and dissolved in 2 ml of a 0.2 N sodium citrate buffer (pH 2.2). This solution was filtered through a 0.45 $\mu$m membrane (Millipore, U.S.A.), followed by analysis in an amino acid autoanalyzer (Biochom 20). The analysis was conducted under the following conditions: wavelength: 440 nm and 570 nm; column temp.: 35–74–80–37° C.: buffer: sodium citrate(pH 3.2–4.25–6.45); flow rate: buffer 35 ml/h, ninhydrin 25 ml/h.

The results are given in Table 7, below.

TABLE 7

Amino Acid Contents in Soybean Sprouts Grown for 5 Days with Highly Electrolyzed Water and Subterranean Water Contents (mg/g of dry weight of Sprouts)

| Amino Acids | Acidic Water (pH 3.0) | Subterranean Water (pH 7.0) | Alkaline Water (pH 11.0) |
|---|---|---|---|
| Asp | 58.0 | 60.7 | 58.7 |
| Glu | 63.4 | 59.1 | 61.3 |
| Ser | 16.1 | 12.9 | 13.9 |
| Gly | 15.5 | 15.1 | 15.1 |
| His | 14.6 | 13.5 | 14.4 |
| Arg | 31.9 | 32.0 | 31.2 |
| Thr | 14.1 | 13.4 | 12.7 |
| Ala | 15.0 | 14.6 | 14.3 |
| Pro | 19.9 | 18.2 | 19.0 |
| Tyr | 11.8 | 9.8 | 10.0 |
| Val | 17.8 | 17.5 | 17.3 |
| Met | 3.6 | 3.1 | 2.6 |
| Cys | 1.7 | 2.0 | 1.6 |
| Ile | 19.7 | 18.6 | 17.7 |
| Leu | 28.1 | 25.1 | 25.3 |
| Phe | 24.2 | 22.9 | 23.4 |
| Lys | 22.0 | 21.3 | 21.8 |
| Total | 377.4 | 359.8 | 361.3 |

As seen in Table 7, no significant differences in amino acid content were detected between the soybean sprouts grown with the highly electrolyzed water (strongly acidic water pH 3.0 and strongly alkaline water pH 11.0) and with subterranean water (pH 7.0). Therefore, the soybean sprouts grown according to the present invention are rich in nutrients, like those conventionally grown.

EXAMPLE VI

Sensory Evaluation of Soups Cooked with Soybean Sprouts Grown with Highly Electrolyzed Water and Subterranean Water Using subterranean water and highly electrolyzed water, soybean sprouts were grown in the same manners as in Example III and IV, respectively. The soybean sprouts were made into soups which were then eaten by 25 adult testee (aged 25–53) for the sensory evaluation regarding taste, odor, texture sense and total flavor. In this regard, anchovies (5–15) and kelp (3–5 g) were added in 1 liter of water which was then let to boil hard. After a sufficient period of time was passed, the anchovies and the kelp were picked up and discarded while well washed soybean sprouts (100–250 g) were added in the remaining, hot water which was again boiled for 3–10 min. When the soybean sprouts were half boiled, the soups were seasoned with salt (5–10 g) and ground garlic (3–5 g) and further boiled for 1–2 min. The soups thus obtained were subjected to the sensory evaluation regarding taste, smell, texture sense and whole flavor. In the sensory tests, evaluation was made by averaging the points which the testee scored according to the following classifications:

Very Good:5
Good:4
Moderate:3
Poor:2
Very Poor:1

The results are given in Table 8, below.

TABLE 8

Sensory Evaluation of Soups Prepared with Soybean Sprouts Grown with Highly Electrolyzed Water and Subterranean Water

| | Soups prepared with Soybean Sprouts Grown with | | |
|---|---|---|---|
| Test Items | Subterranean Water | Acidic water (pH 3.0) | Alkaline water (pH 11.0) |
| Taste | 3.9 | 4.0 | 4.4 |
| Smell | 3.8 | 4.1 | 4.2 |
| Texture sense | 3.9 | 4.0 | 4.2 |
| Whole Flavor | 3.9 | 4.0 | 4.3 |

As apparent from the test results, the soup prepared with the soybean sprouts grown with the alkaline water is superior in all test items to that grown with the subterranean water. When using the acidic water, the same or a little better results were obtained as compared with those when using subterranean water.

When using highly electrolyzed water, as described hereinbefore, soybean sprouts can be grown faster without being rotted. In addition, the present invention is economically favorable in terms of reusing the highly electrolyzed water. Further, the soybean sprouts grown according to the present invention are excellent as foods by virtue of richness in inorganic elements, excellent taste and alkalinity. Also, the present invention can be applied to Brassica, such as radish sprouts, so it will make a contribution to the food industry.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. Bean vegetables cultivated with electrolyzed water which is prepared by electrolyzing inorganic salt-added water at a redox potential of 1,000 mV or higher and having pH values and Na or K contents increased over the pH values and Na or K contents of comparison bean vegetables not cultivated with electrolyzed water.

2. A method for cultivating bean vegetables, comprising:
   (a) preparing electrolyzed water from inorganic salt-added water at a redox potential of 1,000 mV or higher; and
   (b) providing said electrolyzed water to said bean vegetables continually and recycling said provided electrolyzed water to said bean vegetables.

3. The method as set forth in claim 2, wherein said electrolyzed water is strongly acidic water ranging in pH from 2.0 to 6.5 or strongly alkaline water ranging in pH from 7.5–12.5.

4. The method as set forth in claim 2, wherein said electrolyzed water is sprayed continually at a temperature of 15–45° C.

5. The method as set forth in claim 2, wherein said electrolyzed water is sprayed at regular intervals of 0.001~8 hours at a temperature of 15–45° C.

6. The bean vegetables as set forth in claim 1, wherein the electrolyzed water has a pH value of 2 to 6.5 or 7.5 to 12.5.

7. The bean vegetables as set forth in claim 1, wherein the comparison bean vegetables are grown in subterranean water at a pH of 7.0.

8. The method as set forth in claim 3, wherein said acidic water or said alkaline water is sprayed along with subterranean water on the bean vegetables in a regular sequence.

9. The method as set forth in claim 3, wherein said acidic water or said alkaline water is sprayed along with subterranean water on the bean vegetables in an irregular sequence.

10. The method as set forth in claim 2, wherein said electrolyzed water is strongly acidic water ranging in pH from 2.0 to 4.0 or strongly alkaline water ranging in pH from 10.0 to 12.0.

11. The bean vegetables as set forth in claim 1, wherein said electrolyzed water has a pH value of 2.0 to 4.0 or 10.0 to 12.0.

12. The method as set forth in claim 2, wherein said electrolyzed water is sprayed at regular intervals of 0.5–8 hours at a temperature of 15–40° C.

* * * * *